United States Patent Office 3,458,849
Patented July 29, 1969

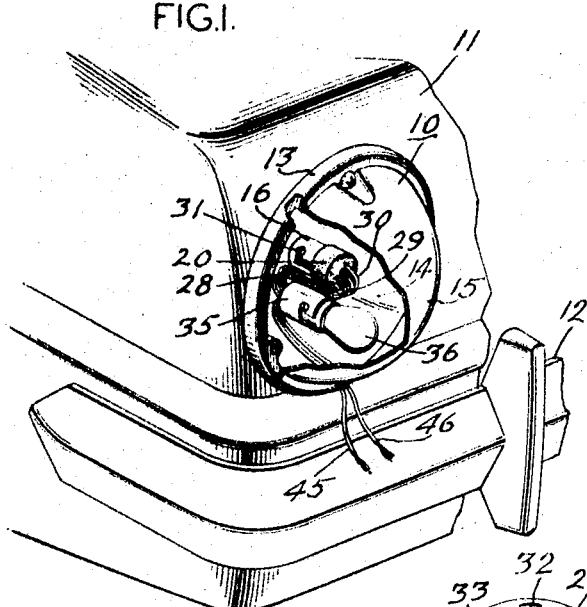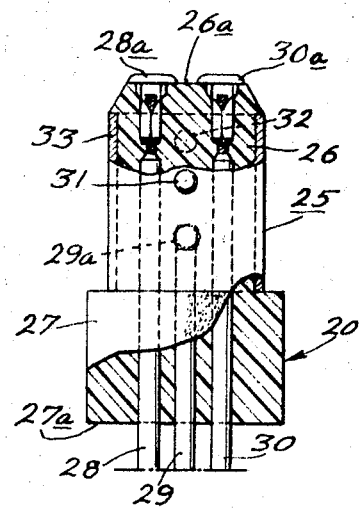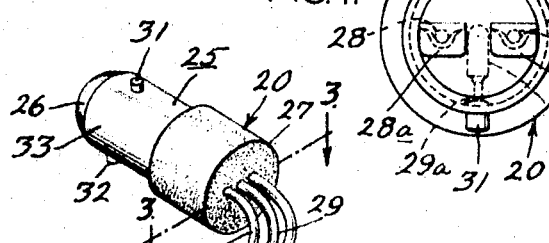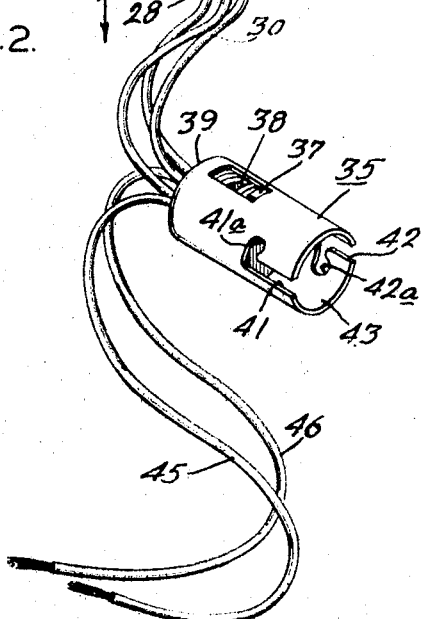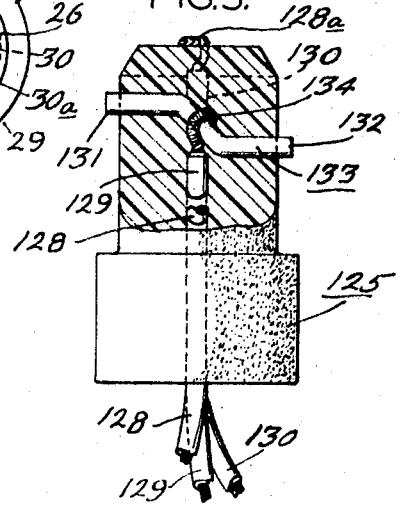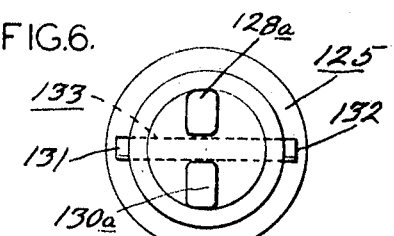

3,458,849
LIGHT ASSEMBLY ADAPTER
George B. Marks, John W. Marks, and Herman J. Marks, Norristown, and Frank J. Piacitelli, Jr., North Wales, Pa., assignors to Technical Innovations Incorporated, Norristown, Pa., a corporation of Pennsylvania
Filed Sept. 13, 1967, Ser. No. 667,564
Int. Cl. H01r 11/00, 23/04, 33/46
U.S. Cl. 339—28                                    4 Claims

ABSTRACT OF THE DISCLOSURE

An adapter for connection in the tail light socket of, for example, a motor vehicle, the adapter including a separate plug and a bulb socket, the plug including a molded cylindrical insert portion and a molded cylindrical base portion which is coaxial with the insert portion, and which is integral with one end thereof. A pair of lead wires extend axially through the plug and terminate at the opposite end thereof in a pair of conventional point contacts, and a third lead wire extends partially through the plug from one end thereof and terminates in radially projecting pins which project a short distance from the cylindrical wall of the first molded portion, and which are axially offset from one another while being substantially and approximately diametrically opposite. The other end of the lead wires are connected to a bulb socket which includes means for receiving a bayonet base type bulb therein, the lead wires associated with the plug being connected to the socket to provide a ready source of E.M.F. for the socket, and, preferably extending from the socket are auxiliary lead wires which are electrically connected to the first mentioned lead wires to provide an auxiliary source of E.M.F. which may pass through the flange mounting of the tail light assembly for connection to lead wires which extend back to, for example, the tail lights of a trailer hitch.

---

The present invention relates to an adapter for light assemblies, and more particularly to a plug and socket adapter which easily and readily provides a source of E.M.F. for example, a trailer hitch.

Quick splice connectors which prick holes in the insulation of wires leading to the tail lights of motor vehicles are well known. This type of connector is often used for connecting lead wires to the tail lights of trailers and like trailer hitches which may be rented in most locations throughout the United States. This method of connecting the tail lights of the trailer to the tail light of the motor vehicle is somewhat hazardous and ofttimes lead to early malfunctioning of the lighting system in the motor vehicle. The reason for this is that the insulator which encloses the wire piercing connector is of an inferior quality and tends, after exposure to frequent weather changes and abuse, to break open permitting the connector to come into contact with exposed metal surfaces, for example in the trunk of the vehicle, causing unintentional shorts in the lighting system. In addition to the danger to the operators of the motor vehicle because of failure of the tail light warning lights or turn signal blinker lights, the additional danger of drawing excessive current which can cause combustion and fire in the trunk compartment of the motor vehicle is ever present.

In view of the above, it is a principal object of the present invention to provide an adapter for a light assembly, particularly the tail light assembly of a motor vehicle, which adapter does not require breaking any connections or piercing any wires leading to the tail light assembly.

Another object of the present invention is to provide an adapter for tail light assemblies and the like which is easily mounted in existing tail light housings while providing a readily and easily accessible source of auxiliary E.M.F. for the tail light assemblies on a trailer hitch or the like.

Still another object of the present invention is to provide an adapter which is easily and quickly connected to an existing tail light assembly on a motor vehicle and which permits operation of the motor vehicle's tail light assembly while providing identical action of the assembly at a remote point, for example at the rearward end of a trailer hitch.

Still another object of the present invention is to provide an adapter for a tail light assembly, which adapter is economical to construct because of the ease of fabricating the plug portion of the adapted by molding the same as a one-piece unitary construction.

Other objects and a fuller understanding of the invention may be had by referring to the following description and claims taken in conjunction with the accompanying drawing in which:

FIG. 1 is a fragmentary perspective view of a typical tail light assembly incorporating the adapter of the present invention;

FIG. 2 is an enlarged perspective view of the adapter constructed in accordance with the present invention and shown in FIG. 1;

FIG. 3 is an enlarged fragmentary sectional view taken along line 3—3 of FIG. 2;

FIG. 4 is a plan view of the portion of the adapter illustrated in FIG. 3;

FIG. 5 is a fragmentary sectional view in side elevation of another embodiment of a portion of the adapter shown in FIG. 1; and FIG. 6 is a plan view of the portion of the adapter illustrated in FIG. 5.

Referring now to the drawings, and particularly FIG. 1 thereof, a typical light assembly 10 is shown mounted on the rear section 11, just above the bumper 12 of a typical motor vehicle. As is conventional, the light assembly 10 includes an outer mounting ring or nacelle 13 connected to the rear section 11, an inner reflector 14 and an outer globe 15. In the central portion of the reflector 14 is a bayonet type socket 16 which normally mounts a two-way bayonet base bulb (not shown). Conventionally, the two way bulb is necessary for illumination not only when the lights of the vehicle are on but for increased illumination when the brake pedal is depressed or when the turn or directional signals are actuated.

In accordance with the present invention, an adapter is provided for the light assembly 10 to provide an auxiliary source of E.M.F. for actuation of the tail lights on a trailer hitch or the like, while simultaneously permitting normal activation of the tail light in the motor vehicle. To this end, the adapter 20 includes a separate plug 25 and bulb socket 35, the plug 25, for reasons which will become more evident hereinafter, being of a unitary, all molded construction. Referring now to FIGS. 2 and 3, the plug 25 includes a first molded cylindrical insert portion 26 including, in the present instance, a conductive sleeve 33, having a diameter such as to permit easy entrance into the socket 16 in the light assembly 10. As shown, connected to the insert portion 26 is a molded cylindrical base portion 27 of increased diametrical dimension so as to seat on the rim of the socket 16, the base portion being coaxial with the first molded cylindrical insert portion and integrally joined to one end thereof.

In order to provide a source of E.M.F. and electric power between the plug 26 and the socket 35 upon insertion of the plug 25 into the socket 16 associated with the light assembly 10, lead wires 28, 29 and 30 interconnect the socket 35 and plug 25. As shown best in FIGS. 3 and 4, the lead wires extend axially through the plug, in the present instance the lead wires 28 and 30 terminating at one end 26a of the plug in a pair of contacts 28a and 30a for engagement with like contacts in the base of the socket 16. As shown in FIG. 3, the third lead 29 extends axially and partially through the plug 25 from the opposite end 27a and terminates in and is electrically connected to a pin 31, through the sleeve 33, which pin radially projects from the wall of the first molded portion 26. As shown in FIGS. 2–4, diametrically opposite the pin 31 and axially spaced therefrom is a pin 32, the pins operative to register and lock in the insertion grooves in the socket 16. In the present instance the sleeves 33 extends along the greater part of the axial length of the insert portion while circumscribing the periphery thereof. The sleeve 33 is of a conventional kind composed of a conductive material such as copper or the like, the lead wire 29 being connected to the sleeve 33 as by a weld or solder as at 29a.

Upon insertion of the plug 25 into the socket 16 in the light assembly 10, a source of E.M.F. is provided, when applied to the socket 16, through the wires 28–30 to the socket 35. The socket 35 is a duplicate of the socket 16 and contains means for receiving a conventional tail light bulb 36 of the type removed from the socket 16 prior to insertion of the plug 25 therein.

As is conventional with bayonet base sockets, the base portion 37 of the socket is spring biased axially of the socket as by a compression spring 38 positioned intermediate one end 39 of the socket and the base 37. Diametrically opposite slots 41 and 42 extending along the wall of the socket from the opposite open end 43 thereof include offset pin engaging portions 41a and 42a respectively, the pin engaging portions being axially offset one from the other so as to permit receipt and locking of the pins radially projecting from the base of the bulb 36. The lead wires 28 and 30 are connected in the base 37 of the socket while the lead wire 29 is connected to the wall of the socket for a corresponding ground connection.

Extending from either the socket 35 or the plug 25 are auxiliary lead wires 45 and 46, in the present instance being connected in the socket 35 to the wires 28 and 30 respectively. As shown in FIG. 1, the lead wires 45 and 46 may extend intermediate the nacelle and globe 15 for connection by any convenient means to the wires leading to the tail lights of the trailer hitch.

The most economical method thus far found for the manufacture of plug 25 according to the invention is molding. In practice, the wires 28 and 30 will be positioned in the mold and spaced from the side walls thereof by conventional means in accordance with good molding practice. Contacts 28a and 30a may be connected to the terminal ends of the wires, or the wires may be permitted to project through the end of the mold for later bending and soldering to form the contacts. In the preferred embodiment, the wire 29 is inserted in the mold already connected to the sleeve 33 as at 29a, the sleeve 33 being substantially coextensive in length with the insert portion 26 and mating with the commensurate portion of the mold. Thereafter the material, such as a polyvinyl chloride or silicon rubber or other dielectric material is poured into the mold and permitted to set. Thereafter the finished plug may be removed from the mold.

FIG. 5 illustrates another embodiment of the plug 25 in which the sleeve 33 is unnecessary. To this end, and as before, lead wires 128 and 130, similar to the lead wires 28 and 30 extend axially through the plug 125 terminating at the opposite end thereof in contacts, in this instance formed by the wires being bent over at the terminal ends thereof and a puddle of solder 128a and 130a being formed which acts as a contact. However, the radially projecting pins 131 and 132 corresponding to the pins 31 and 32 are formed by a bent wire 133 to which the lead in wire 129 has been connected at its central point 134 as by soldering, welding, etc. In manufacture, the wire is supported in the mold, the projecting pin portions 131 and 132 being supported in the walls of the mold.

Thus the adapter of the present invention provides a quick, economical and safe way of proving a source of E.M.F. for trailers or other hitches connected to the rear of automotive vehicles. In practice, if the hitch is to be used occasionally, as with a boat hitch, the terminal ends of the auxiliary wires 45 and 46 may be taped and left in the globe 15 so that they may later be reused.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

What is claimed is:

1. An adapter for light assemblies, said adapter including a separate plug and bulb socket, said plug comprising a first molded cylindrical insert portion and a molded cylindrical base portion coaxial with said insert portion and integral with one end thereof; at least one lead wire extending through and axially of said plug and terminating at the opposite end thereof in an exposed contact; a second lead wire extending partially through said plug from said one end and terminating in a pin radially projecting from the wall of said first insert portion; a second pin electrically connected to said first pin and extending radially from said wall approximately diametrically opposite said first pin; said bulb socket having means for receiving a bayonet type bulb therein, said first and second lead wire associated with said plug being connected to said socket to provide electrical continuity between said plug and said socket; and at least one auxiliary wire lead connected to said first lead whereby, upon a source of E.M.F. being applied to said plug said auxiliary wire lead is also provided with a source of E.M.F.

2. An adapter for light assemblies in accordance with claim 1 including a conductive sleeve substantially coextensive with said insert portion and circumscribing the periphery thereof; said sleeve including said pins, and said second lead wire connected through said insert portion to said sleeve.

3. An adapter for light assemblies in accordance with claim 1 wherein said radially projecting pins include a bent wire, the opposite terminal ends of which project from the wall of said insert portion forming said pins.

4. An adapter for light assemblies in accordance with claim 1 including a third lead wire extending through and axially of said plug and terminating at the opposite end thereof in a second contact laterally spaced from said first contact, said third lead wire connected to said socket and a second auxiliary lead wire connected to said third lead wire.

References Cited

UNITED STATES PATENTS

| | | | |
|---|---|---|---|
| 1,146,084 | 7/1915 | McLean et al. | 339—163 XR |
| 1,217,058 | 2/1917 | Pohl | 339—188 |
| 3,137,448 | 6/1964 | Holzhause | 339—188 XR |
| 3,272,913 | 9/1966 | Crimmins et al. | 339—188 XR |

FOREIGN PATENTS 616,890  2/1961  Italy.

RICHARD E. MOORE, Primary Examiner

P. A. CLIFFORD, Assistant Examiner

U.S. Cl. X.R.

240—8.3; 339—163, 188